(12) United States Patent
Lin et al.

(10) Patent No.: US 10,840,825 B2
(45) Date of Patent: Nov. 17, 2020

(54) VOLTAGE BALANCE CONTROL METHOD AND DEVICE FOR THREE-PHASE DC-AC INVERTER

(71) Applicant: INDUSTRIAL TECHNOLOGY RESEARCH INSTITUTE, Hsinchu (TW)

(72) Inventors: Meng-Yi Lin, Hsinchu (TW); Yoshihiro Konishi, Hsinchu (TW); Zong-Zhen Yang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/166,373

(22) Filed: Oct. 22, 2018

(65) Prior Publication Data
US 2019/0131884 A1 May 2, 2019

Related U.S. Application Data

(60) Provisional application No. 62/577,210, filed on Oct. 26, 2017.

(51) Int. Cl.
*H02M 7/538* (2007.01)
*H02M 7/5387* (2007.01)

(52) U.S. Cl.
CPC ... *H02M 7/53871* (2013.01); *H02M 7/53875* (2013.01)

(58) Field of Classification Search
CPC .................. H02M 7/53871; H02M 7/53875
See application file for complete search history.

(56) References Cited

U.S. PATENT DOCUMENTS 5,422,518 A * 6/1995 Sashida .................... H02J 3/38
307/75
5,929,592 A * 7/1999 Kwon ................ H02M 1/4233
318/801

(Continued)

FOREIGN PATENT DOCUMENTS

| CN | 101728942 | 3/2012 |
| CN | 102435869 | 5/2012 |

(Continued)

OTHER PUBLICATIONS

Taiwanese Office Action for Taiwanese Patent Application No. 107137263 dated Jan. 6, 2020.

(Continued)

*Primary Examiner* — Fred E Finch, III
*Assistant Examiner* — Rafael O De Leon Domenech
(74) *Attorney, Agent, or Firm* — Amin, Turocy & Watson, LLP

(57) ABSTRACT

A voltage balance control method applicable to a three-phase DC-AC inverter is provided, the voltage balance control method including: multiplying, by a first multiplier, an actual value of a line capacitance voltage by a sine function to generate a first voltage; capturing, by a first filter, a DC part of the first voltage to generate an error DC component; subtracting, by a first subtractor, the error DC component from a target voltage amplitude to generate a second voltage; adjusting, by a first proportional-integral controller, the second voltage to generate an amplitude error compensation value; and adding, by an adder, the amplitude error compensation value with the target voltage amplitude to generate an amplitude reference value. A voltage balance control device applicable to a three-phase DC-AC inverter is also provided.

12 Claims, 13 Drawing Sheets

(56) References Cited

U.S. PATENT DOCUMENTS

| | | |
|---|---|---|
| 8,965,747 B2 | 2/2015 | Zhang et al. |
| 9,382,898 B2 | 7/2016 | Teodorescu et al. |
| 9,728,971 B2 | 8/2017 | Robertazzi et al. |
| 2003/0034748 A1* | 2/2003 | Walters .............. H02P 6/20 318/400.11 |
| 2003/0034751 A1* | 2/2003 | Walters .............. H02P 6/21 318/445 |
| 2003/0102829 A1* | 6/2003 | Walters .............. H02P 21/34 318/400.09 |
| 2011/0133546 A1* | 6/2011 | Jang .............. H02M 7/53871 307/9.1 |
| 2011/0134669 A1 | 6/2011 | Yuzurihara et al. |
| 2013/0154528 A1 | 6/2013 | Hung et al. |
| 2015/0092462 A1 | 4/2015 | Ohori et al. |

FOREIGN PATENT DOCUMENTS

| | | |
|---|---|---|
| CN | 102629766 | 8/2012 |
| CN | 102856920 | 1/2013 |
| CN | 103095170 | 5/2013 |
| CN | 103296906 | 9/2013 |
| CN | 203289103 | 11/2013 |
| CN | 103825478 | 5/2014 |
| CN | 103904654 | 7/2014 |
| CN | 104362655 | 2/2015 |
| CN | 104854784 | 8/2015 |
| CN | 103956926 | 5/2016 |
| TW | 201015831 | 4/2010 |
| TW | 201240303 | 10/2012 |

OTHER PUBLICATIONS

Chinese Office Action for Chinese Patent Application No. 201811251446.6 dated Mar. 2, 2020.

Vechiu, et al. "Digital Control of a Three-Phase Four-Leg Inverter under Unbalanced Voltage Conditions", 2007 European Conference on Power Electronics and Applications; 2007; p. 1-10.

Park, et al. "Unbalanced Three-Phase Control using Offset-Voltage for H-Bridge Multilevel Inverter with Faulty Power Cells", 2008 IEEE Power Electronics Specialists Conference; 2008; p. 1790-1795.

Pirooz, et al. "Predictive Voltage Control of Three-Phase Voltage Source Inverters to Supply Nonlinear and Unbalanced Loads", the 6th Power Electronics, Drive Systems &Technologies Conference (PEDSTC2015); 2015; p. 389-394.

Cai, et al. "Controller Design for Three-Phase Inverter with Power Unbalanced Loads Applied in Microgrids", 2015 IEEE Energy Conversion Congress and Exposition (ECCE); 2015; p. 4588-4593.

Guo, et al. "An Automatic Voltage Compensation Technique for Three-Phase Stand-Alone Inverter to Serve Unbalanced or Nonlinear Load", 2015 IEEE 2nd International Future Energy Electronics Conference (IFEEC); 2015; p. 1-6.

* cited by examiner

VOLTAGE BALANCE CONTROL METHOD AND DEVICE FOR THREE-PHASE DC-AC INVERTER

CROSS-REFERENCE TO RELATED APPLICATIONS

This application claims priority to U.S. Provisional Application Ser. No. 62/577,210, filed on Oct. 26, 2017. The entirety of the above-mentioned patent application is hereby incorporated by reference herein and made a part of this specification.

BACKGROUND

1. Technical Field

This disclosure relates to voltage balance control methods and devices, and, more particularly, to a voltage balance control method and a voltage balance control device applicable to a three-phase DC-AC inverter.

2. Description of Related Art

Currently, power systems are categorized into a three-phase power and a single-phase power. If having the same specification, a single-phase load and a three-phase power can be connected, in order to save the manufacturing cost of a single-phase power. However, such connection causes unbalance among phases of the three-phase power. A three-phase DC-AC inverter is generally applied to a renewable energy independent system or an uninterruptable power supply system, and has to have an output voltage of high quality. However, the quality of the output voltage will be affected by the unbalanced load. For instance, an inductor manufacturing error at an output end causes an output impedance mismatched, in consideration of situations of a three-phase load converted into a single-phase load or a load variation on a three-phase DC-AC inverter.

Moreover, a direct-axis (d-axis) quadrature-axis (q-axis) positive negative zero phase sequence conversion control method is used in general. Since having no feedback current to control an output voltage, the control method has a poor dynamic response. In addition, a proportional resonant controller is also provided in some cases to achieve voltage balance control. However, the proportional resonant controller has to be installed with a sensor component at an output end thereof in order to obtain a load current, and thus cannot achieve a well enough balance effect.

Therefore, how to solve the problem abovementioned, how to effectively reduce an output voltage and how to avoid a control error when the load is balanced, and how to improve the performance of the whole system is becoming an urgent issue in the art.

SUMMARY

A voltage balance control method and a voltage balance control device applicable to a three-phase DC-AC inverter are provided.

In an embodiment, a voltage balance control method is applicable to a three-phase DC-AC inverter according to the present disclosure. The voltage balance control method comprises: multiplying, by a first multiplier, an actual value of a line capacitance voltage by a sine function to generate a first voltage; capturing, by a first filter, a DC part of the first voltage to generate an error DC component; subtracting, by a first subtractor, the error DC component from a target voltage amplitude to generate a second voltage; adjusting, by a first proportional-integral controller, the second voltage to generate an amplitude error compensation value; and adding, by an adder, the amplitude error compensation value with the target voltage amplitude to generate an amplitude reference value.

In another embodiment, a voltage balance control device is applicable to a three-phase DC-AC inverter, and the voltage balance control device is implemented by a chip or integrated in the chip. The voltage balance control device comprises: a reference value regulator configured for outputting a new reference value, wherein a feedback value is inputted to the reference value regulator; a subtracting device connected to an output end of the reference value regulator and configured for subtracting the feedback value from the new reference value; and a voltage regulator connected to the subtracting device.

In an embodiment, the reference value regulator comprises: a first multiplier configured for outputting a first voltage, wherein the feedback value and a sine function are inputted to the first multiplier; a first filter connected to the first multiplier and configured for capturing a DC part of the first voltage and outputting an error DC component; a first subtractor connected to the first filter and configured for outputting a second voltage, wherein the first subtractor subtracts the error DC component from a target voltage amplitude; a first proportional-integral controller connected to the first subtractor and configured for outputting an amplitude error compensation value, wherein the first proportional-integral controller adjusts the second voltage; and an adder connected to the first proportional-integral controller and configured for outputting an amplitude reference value, wherein the adder adds the amplitude error compensation value to the target voltage amplitude.

In an embodiment, the reference value regulator comprises: a second multiplier configured for outputting a third voltage, wherein the feedback value and a cosine function are inputted to the second multiplier; a second filter connected to the second multiplier and configured for capturing a phase part of the third voltage and outputting a phase error component; a second proportional-integral controller connected to the second filter and configured for outputting a phase error compensation value, wherein the second proportional-integral controller adjusts the phase error component; a second subtractor connected to the second proportional-integral controller and configured for outputting a phase reference value, wherein the second subtractor subtracts the phase error compensation value from a target voltage phase; and a sine wave generator connected to the second subtractor and configured for outputting a sine wave value, wherein the phase reference value is inputted to the sine wave generator.

In an embodiment, the reference value regulator comprises a third multiplier configured for outputting the new reference value, wherein the amplitude reference value and the sine wave value are inputted to the third multiplier.

BRIEF DESCRIPTION OF DRAWINGS

The disclosure can be more fully understood by reading the following detailed description of the preferred embodiments, with reference made to the accompanying drawings, wherein.

DETAILED DESCRIPTION

Figure 1:
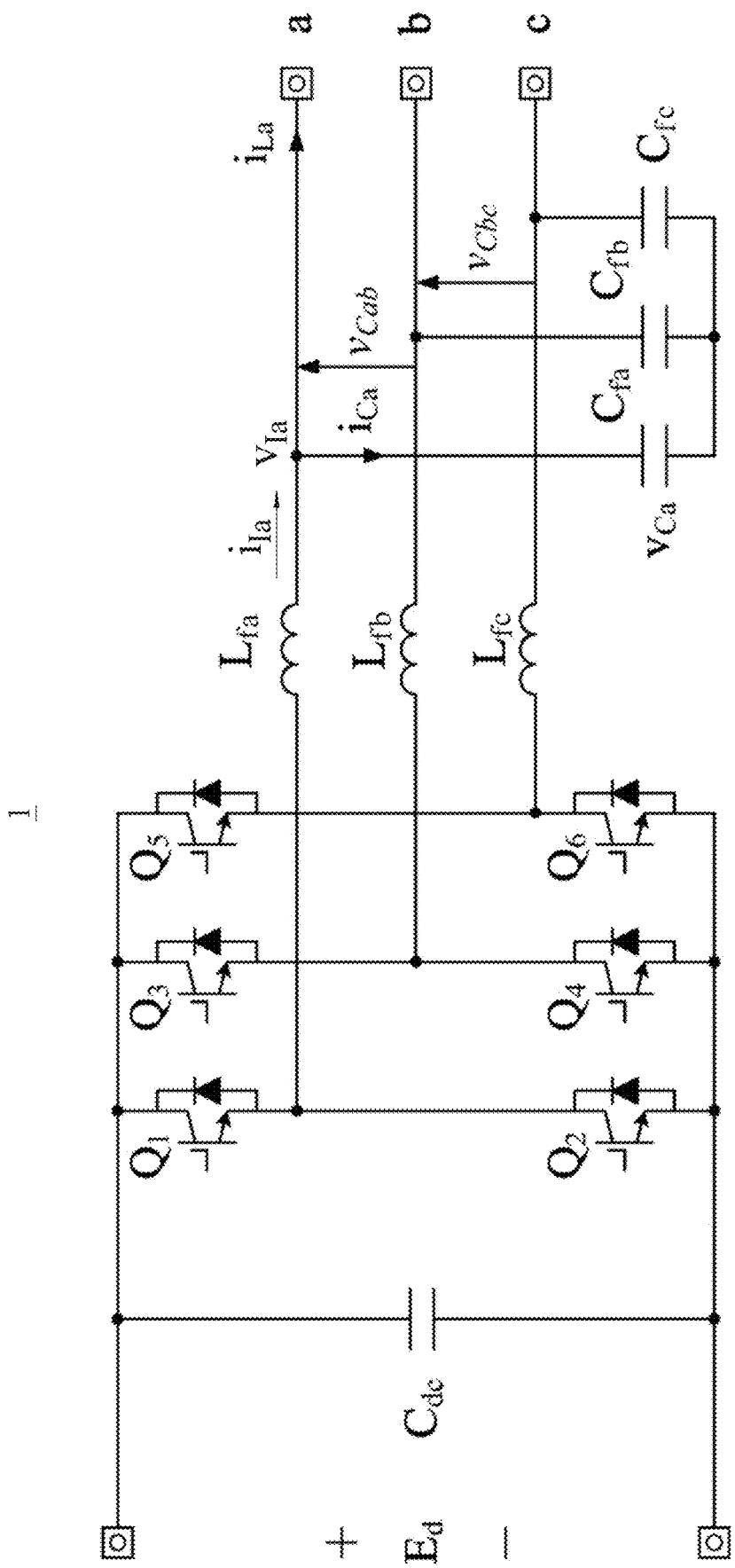
FIG. 1 is a schematic diagram of a circuit architecture of a voltage balance control device according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a voltage balance control method and a voltage balance control device to analyze and compensate the amplitude and phase of the control voltage reference value, to balance the output voltage in a balanced manner even when an output load is not matched.

A voltage balance control method and a voltage balance control device according to the present disclosure can be applied to a DC-AC inverter 1. FIG. 1 shows a circuit architecture of a three-phase DC-AC inverter 1, which comprises a DC-link capacitor $C_{dc}$, six switching components $Q_1$-$Q_6$, a filtering circuit composed of three filtering inductors $L_{fa}$, $L_{fb}$ and $L_{fc}$, and three filtering capacitors $C_{fa}$, $C_{fb}$ and $C_{fc}$, wherein every two of the switching components constitute an independent phase. For instance, the switching components $Q_1$ and $Q_2$ constitute a phase, the switching components $Q_3$ and $Q_4$ constitute b phase, and the switching components $Q_5$ and $Q_6$ constitute c phase. In addition, $E_d$ is a DC-link voltage, $v_{Ia}$ is an AC voltage of a phase of the DC-AC inverter, $i_{Ia}$ is an AC current of a phase of the DC-AC inverter, $v_{Ca}$ is an AC filtering capacitance voltage of a phase, $i_{Ca}$ is an AC filtering capacitance current of a phase, $i_{La}$ is a load current of a phase, and parameters of b phase and c phase can be inferred accordingly; $v_{Cab}$ is an actual value of an ab line capacitance voltage (i.e., ab two-phase capacitance voltage $v_{Cab}$), and $v_{Cbc}$ is an actual value of a bc line capacitance voltage (i.e., bc two-phase capacitance voltage $v_{Cbc}$).

The present disclosure provides a voltage balance control method applicable to a three-phase DC-AC inverter. As shown in FIG. 2 to FIGS. 5A and 5B, the method comprises steps S10 to S20.

Figure 2:
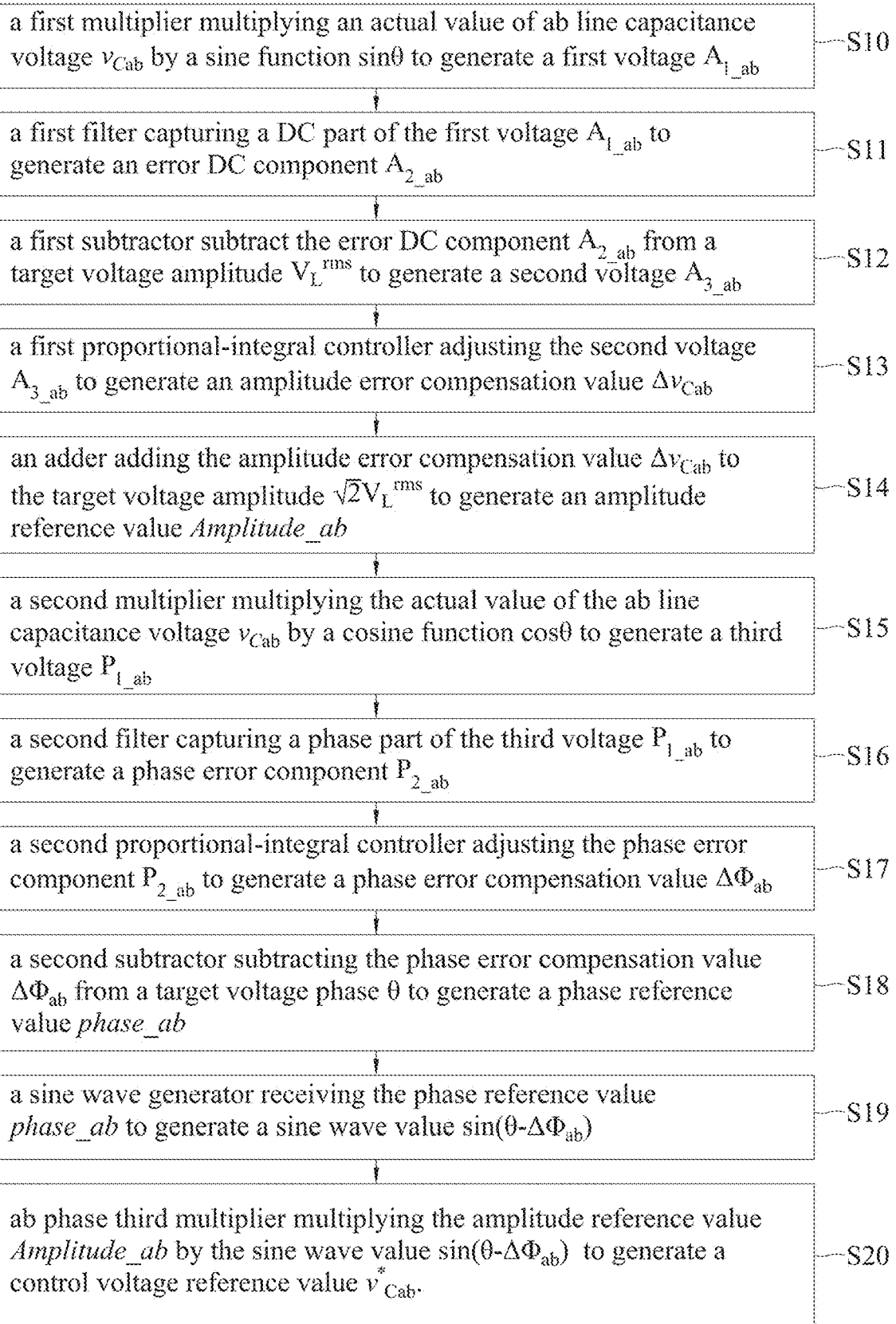
FIG. 2 is a flow chart of a voltage balance control method according to the present disclosure.
Figure 3:
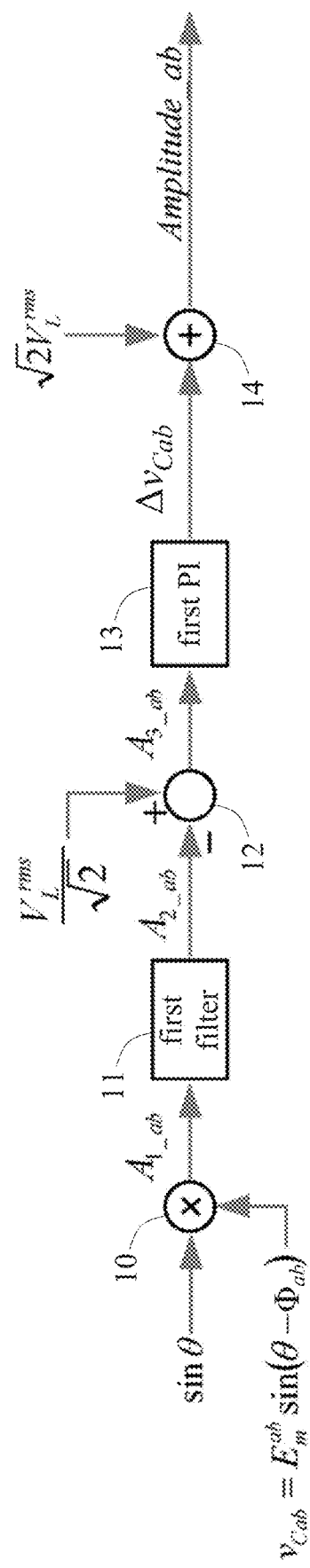
FIG. 3 is a block diagram of an amplitude reference value unit of a voltage balance control device according to the present disclosure.

In the step S10 of FIG. 2, a first multiplier 10 of FIG. 3 multiplies an actual value of ab line capacitance voltage $v_{Cab}$ by a sine function $\sin\theta$ to generate a first voltage $A_{1\_ab}$.

In the step S11 of FIG. 2, a first filter 11 of FIG. 3 captures a DC part of a first voltage $A_{1\_ab}$ to generate an error DC component $A_{2\_ab}$.

In the step S12 of FIG. 2, a first subtractor 12 of FIG. 3 subtracts an error DC component $A_{2\_ab}$ from a target voltage amplitude $V_L^{rms}$ to generate a second voltage $A_{3\_ab}$, which can be considered as an amplitude error component. In reality, according to equation (4)

$$A_{2\_ab} = \frac{E_m^{ab}}{2}\cos\Phi_{ab} = \frac{E_m^{ab}}{2} = \frac{\sqrt{2}}{2}V_L^{ab} = \frac{V_L^{ab}}{\sqrt{2}},$$

the target voltage amplitude $V_L^{rms}$ has to be divided by $\sqrt{2}$, and then the error DC component $A_{2\_ab}$ is subtracted from the target voltage amplitude $V_L^{rms}/\sqrt{2}$.

In the step S13 of FIG. 2, a first proportional-integral controller 13 of FIG. 3 adjusts the second voltage $A_{3\_ab}$ to generate an amplitude error compensation value $\Delta v_{Cab}$.

In the step S14 of FIG. 2, an adder 14 of FIG. 3 adds the amplitude error compensation value $\Delta v_{Cab}$ to a target voltage amplitude $\sqrt{2}V_L^{rms}$ to generate an amplitude reference value Amplitude_ab. In reality, in order to obtain a peak value of the target voltage amplitude $V_L^{rms}$, the target voltage amplitude $V_L^{rms}$ has to be multiplied by $\sqrt{2}$, Then, the target voltage amplitude $V_L^{rms}$ multiplied by $\sqrt{2}$ is added to the amplitude error compensation value $\Delta v_{Cab}$, as shown in equation (6).

Figure 4:
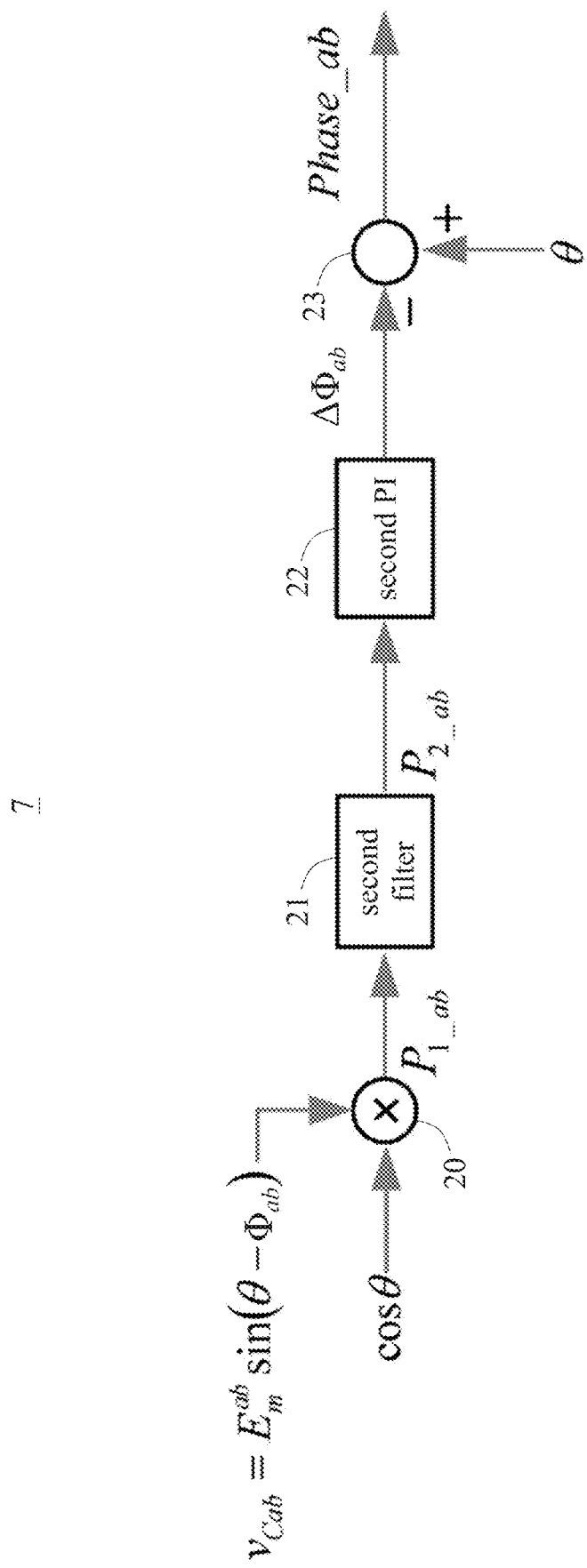
FIG. 4 is a block diagram of a phase reference value unit of a voltage balance control device according to the present disclosure.

In the step S15 of FIG. 2, a second multiplier 20 of FIG. 4 multiplies the actual value of the ab line capacitance voltage $V_{Cab}$ by a cosine function $\cos\theta$ to generate a third voltage $P_{1\_ab}$.

In the step S16 of FIG. 2, a second filter 21 of FIG. 4 captures a phase part of a third voltage $P_{1\_ab}$ to generate a phase error component $P_{2\_ab}$.

In the step S17 of FIG. 2, a second proportional-integral controller 22 of FIG. 4 adjusts the phase error component $P_{2\_ab}$ to generate a phase error compensation value $\Delta\Phi_{ab}$.

In the step S18 of FIG. 2, a second subtractor 23 of FIG. 4 subtracts an phase error compensation value $\Delta\Phi_{ab}$ from a target voltage phase $\theta$ to generate a phase reference value phase_ab.

Figure 5A:
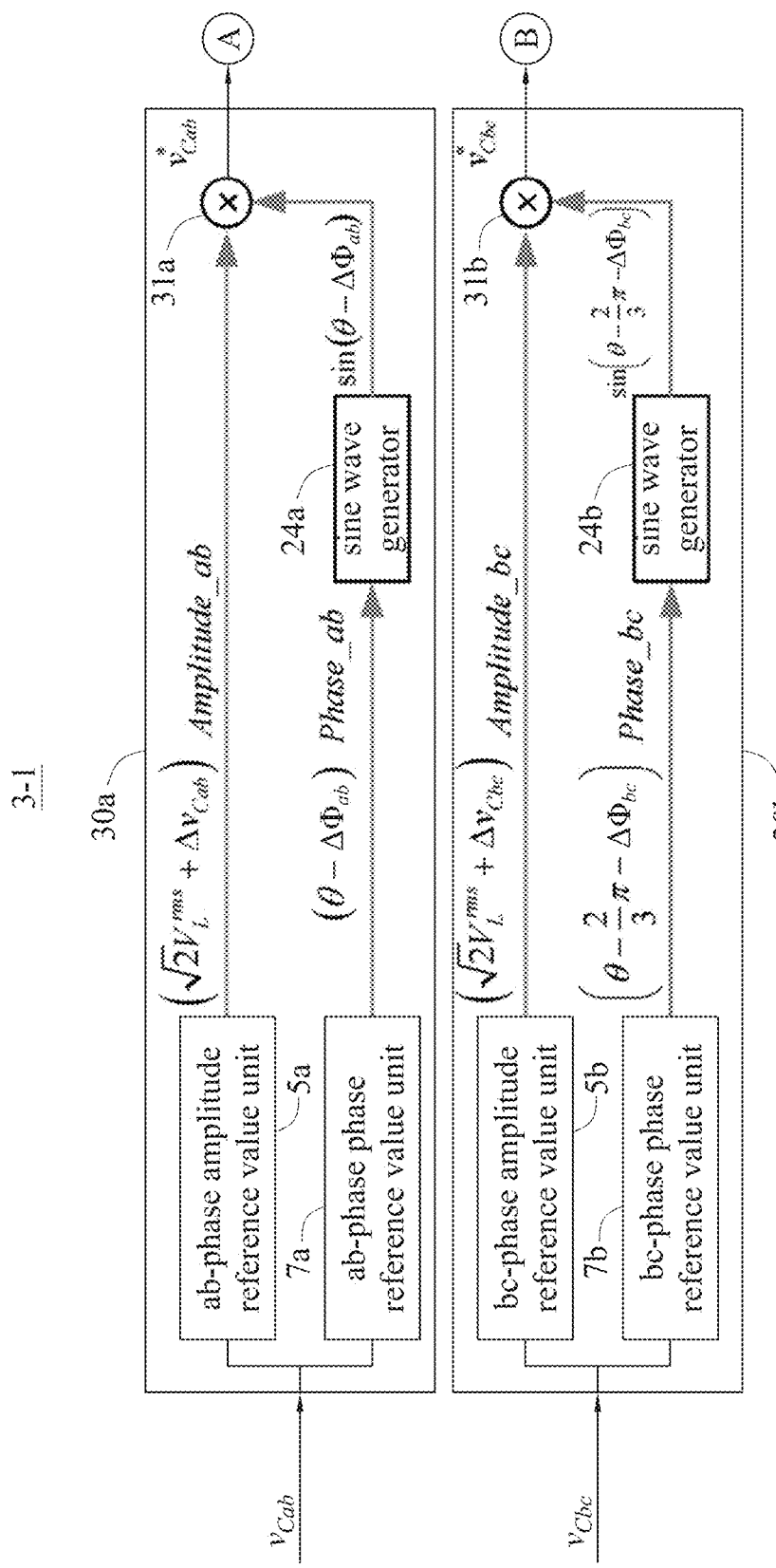
FIG. 5A shows a block diagram of an amplitude reference value and a phase reference value of ab phase and bc phase of a voltage balance control device according to the present disclosure.

In the step S19 of FIG. 2, a sine wave generator 24a of FIG. 5A receives the phase reference value phase_ab to generate a sine wave value $\sin(\theta-\Delta\Phi_{ab})$.

In the step S20 of FIG. 2, an ab phase third multiplier 31a of FIG. 5A multiplies the amplitude reference value Amplitude_ab by the sine wave value $\sin(\theta-\Delta\Phi_{ab})$ to generate a control voltage reference value $v^*_{Cab}$. The control voltage reference value $v^*_{Cab}$ is a control command.

FIG. 3 shows a block diagram of an amplitude reference value unit 5 of a voltage balance control device according to the present disclosure, with ab phase as an example. The amplitude reference value Amplitude_ab is controlled as follows.

An ideal control voltage reference value $v^*_{Cab\_ideal}$ of ab phase capacitance of a three-phase DC-AC inverter is a sine wave function, as shown in equation (1):

$$v^*_{Cab\_ideal} = E_m \sin\theta = \sqrt{2} V_L^{rms} \sin\theta \qquad (1)$$

where $E_m$ is a voltage peak reference value, $V_L^{rms}$ is a reference line voltage effective value, and $v^*_{Cab\_ideal}$ is an ideal control voltage reference value.

However, there are amplitude and phase errors between an actual value of ab line capacitance voltage $v_{Cab}$ and the ideal control voltage reference value $v^*_{Cab\_ideal}$ of a three-phase DC-AC inverter. The actual value of ab line capacitance voltage $v_{Cab}$ is shown in equation (2):

$$v_{Cab} = E_m^{ab} \sin(\theta - \Phi_{ab}) \qquad (2)$$

where $v_{Cab}$ is an actual value of ab line capacitance voltage, $E_m^{ab}$ is a voltage peak reference value of ab phase, $\theta$ is a phase, and $\Phi_{ab}$ is a phase difference.

The first multiplier 10 multiplies the actual value of ab line capacitance voltage $v_{Cab}$ by the sine function $\sin\theta$ to generate the first voltage $A_{1\_ab}$, as shown in equation (3):

$$A_{1\_ab} = \sin\theta \times v_{Cab} = \sin\theta \times E_m^{ab} \sin(\theta - \Phi_{ab}) = \frac{E_m^{ab}}{2}[\cos\Phi_{ab} - \cos(2\theta - \Phi_{ab})], \qquad (3)$$

where $\theta$ is a phase, $v_{Cab}$ is the actual value of the ab line capacitance voltage, $\Phi_{ab}$ is a phase difference, and $E_m^{ab}$ is a voltage peak reference value of ab phase.

It can be seen from the equation (3) that the first voltage $A_{1\_ab}$ comprises a DC component and a two-time angular frequency component. Assuming that the phase difference $\Phi_{ab}$ is very small, the first voltage $A_{1\_ab}$ passes through the first filter 11. For instance, the first filter 11 may be a moving average filter or a device that can capture a current value, and the first filter 11 generates the error DC component $A_{2\_ab}$, as shown in equation (4):

$$A_{2\_ab} = \frac{E_m^{ab}}{2}\cos\Phi_{ab} = \frac{E_m^{ab}}{2} = \frac{\sqrt{2}}{2}V_L^{ab} = \frac{V_L^{ab}}{\sqrt{2}}, \qquad (4)$$

where $E_m^{ab}$ is the voltage peak reference value of ab phase, $\Phi_{ab}$ is the phase difference, and $V_L^{ab}$ is a voltage effective value of ab line.

Then, the first subtractor 12 subtracts the error DC component $A_{2\_ab}$ from the target voltage amplitude $V_L^{rms}$ (which has to be divided by $\sqrt{2}$ because of the coefficient relation of the operation) to obtain the second voltage $A_{3\_ab}$, as shown in equation (5):

$$A_{3\_ab} = \frac{V_L^{rms}}{\sqrt{2}} - \frac{E_m^{ab}}{2}\cos\Phi_{ab}, \qquad (5)$$

where $V_L^{rms}$ is the target voltage amplitude, $E_m^{ab}$ is the voltage peak reference value of ab phase, $\Phi_{ab}$ is the phase difference, and the second voltage $A_{3\_ab}$ can also be considered as an amplitude error component.

The first proportional-integral controller (PI controller) 13 calculates and adjusts the error DC component $A_{2\_ab}$ to obtain the amplitude error compensation value $\Delta v_{Cab}$. The adder 14 adds the target voltage amplitude $V_L^{rms}$ (which will be multiplied by $\sqrt{2}$ in order to obtain the peak value of the target voltage amplitude $V_L^{rm}$) to the amplitude error compensation value $\Delta v_{Cab}$ to obtain the amplitude reference value Amplitude_ab, as shown in equation (6):

$$\text{Amplitude\_ab} = \sqrt{2} V_L^{rms} + \Delta v_{Cab} \qquad (6)$$

The controlling of the amplitude reference value Amplitude_ab of a voltage balance control device according to the present disclosure has been described in details previously. The voltage balance control device according to the present disclosure also comprises controlling of a phase reference value. FIG. 4 is a block diagram of a phase reference value unit 7 of a voltage balance control device according to the present disclosure, with ab phase as an example. The phase reference value phase_ab is controlled as followed.

It is assumed that the actual value of ab line capacitance voltage $v_{Cab}$ of the three-phase DC-AC inverter is shown as equation (2). The second multiplier 20 multiplies the actual value of the ab line capacitance voltage $v_{Cab}$ by a cosine function $\cos\theta$ to generate a third voltage $P_{1\_ab}$, as shown in equation (7):

$$P_{1\_ab} = \cos\theta \times v_{Cab} = \cos\theta \times E_m^{ab} \sin(\theta - \Phi_{ab}) = \frac{E_m^{ab}}{2}[-\sin\Phi_{ab} + \sin(2\theta - \Phi_{ab})], \qquad (7)$$

where $\theta$ is a phase, $E_m^{ab}$ is the voltage peak reference value of ab phase, and $\Phi_{ab}$ is the phase difference.

It can be seen from equation (7) that the third voltage $P_{1\_ab}$ comprises the DC component and the two-time angular frequency component. The third voltage $P_{1\_ab}$ passes through the second filter 21 (such as a moving average filter), and assuming that the phase difference $\Phi_{ab}$ is very small, the phase error component $P_{2\_ab}$ can be obtained, as shown in equation (8):

$$P_{2\_ab} = -\frac{E_m^{ab}}{2}\sin\Phi_{ab} \cong -\frac{E_m^{ab}}{2}\Phi_{ab}, \qquad (8)$$

where $E_m^{ab}$ is the voltage peak reference value of ab phase, and $\Phi_{ab}$ is the phase difference.

The phase error component $P_{2\_ab}$, after passing through the second proportional-integral controller 22, can generate the phase error compensation value $\Delta\Phi_{ab}$. The second subtractor 23 subtracts the phase error compensation value $\Delta\Phi_{ab}$ from the target voltage phase $\theta$ to obtain the phase reference value Phase_ab, as shown in equation (9):

$$\text{Phase\_ab} = \theta - \Delta\Phi_{ab} \qquad (9)$$

Then, a sine wave generator 24a receives the phase reference value phase_ab to obtain a sine wave value $\sin(\theta - \Delta\Phi_{ab})$.

Then, the ab phase third multiplier 31a multiples the amplitude reference value Amplitude_ab by the sine wave value $\sin(\theta - \Delta\Phi_{ab})$ to obtain the control voltage reference value $v^*_{Cab}$, as shown in equation (10).

$$v^*_{Cab} = (\sqrt{2} V_L^{rms} + \Delta v_{Cab})\sin(\theta - \Delta\Phi_{ab}) \qquad (10)$$

Similarly, the control voltage reference value $v^*_{Cbc}$ of bc phase can also be obtained, as shown in equation (11).

$$v^*_{Cbc} = \left(\sqrt{2}\, V_L^{rms} + \Delta v_{Cbc}\right) \sin\left(\theta - \frac{2}{3}\pi - \Delta\Phi_{bc}\right) \tag{11}$$

Figure 5B:
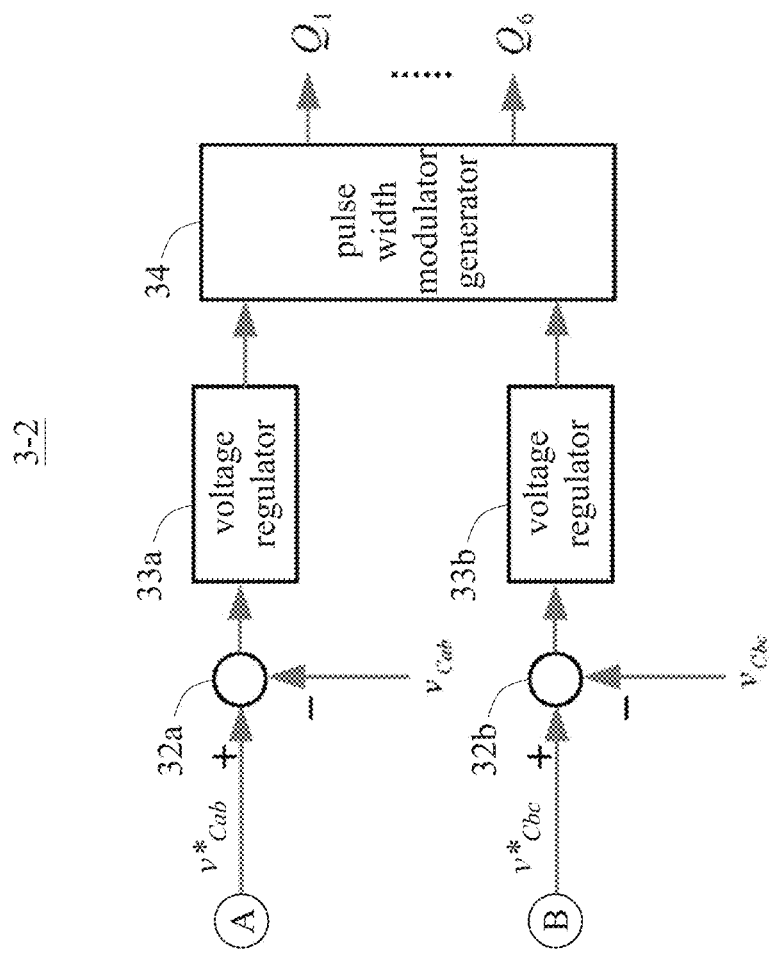
FIG. 5B shows a block diagram of voltage regulators and a pulse width modulator generator according to the present disclosure.

Refer to FIGS. 5A and 5B, which show voltage balance control devices 3-1 (a front half part) and 3-2 (a rear half part) according to the present disclosure. The voltage balance control device 3-1 includes reference value regulators 30a and 30b. As shown in FIG. 5B, the voltage balance control device 3-2 comprises subtracting devices 32a and 32b, voltage regulators 33a and 33b, and a pulse width modulator (PWM) generator 34. As shown in FIG. 5A, the reference value regulator 30a comprises an ab-phase amplitude reference value unit 5a (such as the amplitude reference value unit 5 of FIG. 3), an ab-phase phase reference value unit 7a (such as the phase reference value unit 7 of FIG. 4), a sine wave generator 24a and an ab phase third multiplier 31a. The ab-phase amplitude reference value unit 5a outputs the amplitude reference value Amplitude_ab to the ab phase third multiplier 31a. The ab-phase phase reference value unit 7a outputs the phase reference value Phase_ab to the sine wave generator 24a. The ab phase third multiplier 31a outputs the control voltage reference value $v^*_{Cab}$ of ab phase. The reference value regulator 30b comprises a bc-phase amplitude reference value unit 5b (similar to the amplitude reference value unit 5 of FIG. 3, and differs in that the input is an actual value of a bc line capacitance voltage $v_{Cbc}$), a bc-phase phase reference value unit 7b (similar to the phase reference value unit 7 of FIG. 4, and differs in that the input is an actual value of a bc line capacitance voltage $v_{Cbc}$), a sine wave generator 24b and a bc phase third multiplier 31b. The bc-phase amplitude reference value unit 5b outputs the amplitude reference value Amplitude_bc to the bc phase third multiplier 31b. The bc-phase phase reference value unit 7b outputs the phase reference value Phase_bc to the sine wave generator 24b. The bc phase third multiplier 31b outputs the control voltage reference value $v^*_{Cbc}$ of bc phase. As shown in FIG. 5B, the subtracting device 32a subtracts the actual value of an ab line capacitance voltage $v_{Cab}$ from the control voltage reference value $V_{Cab}^*$ of the ab phase, and signals output from the subtracting device 32a then enter the voltage regulator 33a and the pulse width modulator generator 34. The subtracting device 32b subtracts the actual value of a bc line capacitance voltage $v_{Cbc}$ from the control voltage reference value $v^*_{Cbc}$ of bc phase, and signals output from the subtracting device 32b then enter the voltage regulator 33b and the pulse width modulator generator 34. As shown in FIGS. 5A and 5B, the controlling of the control voltage reference value $v_{Cab}^*$ and $v^*_{Cbc}$ of ab phase and bc phase can be applied to various controllers. A modulation index of a switching signal can be obtained through the voltage regulators 33a and 33b, and switching signals of the switching components $Q_1$-$Q_6$ can thus be controlled, which causes the output voltage of the three-phase DC-AC inverter to be balanced.

Figure 6:
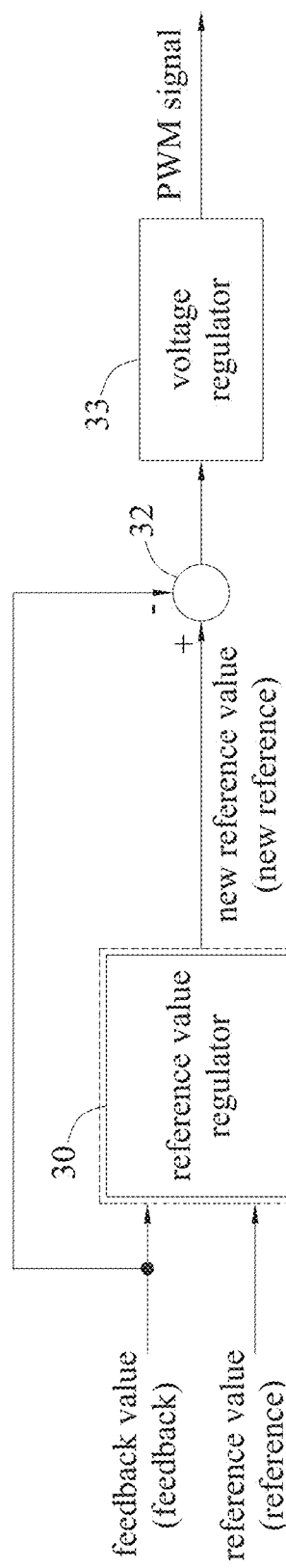
FIG. 6 is a block diagram of a voltage balance control device according to the present disclosure.

FIG. 6 is a block diagram of a voltage balance control device 8 according to the present disclosure. The voltage balance control device 8 may be implemented by a chip or integrated as a chip, and comprise a reference value regulator 30, a subtracting device 32 and a voltage regulator 33. The reference value regulator 30 of FIG. 6 is equivalent to the reference value regulators 30a and 30b of FIG. 5A. The subtracting device 32 of FIG. 6 is equivalent to the subtracting devices 32a and 32b of FIG. 5B. The voltage regulator 33 of FIG. 6 is equivalent to the voltage regulators 33a and 33b of FIG. 5B. The reference value regulator 30 outputs a new reference value. A feedback value is inputted to the reference value regulator 30 and the subtracting device 32. The subtracting device 32 is connected to the output end of the reference value regulator 30, and subtracts the feedback value from the new reference value. The feedback value is an actual measuring value, such as the actual value of an ab line capacitance voltage $v_{Cab}$ or the actual value of a bc line capacitance voltage $v_{Cbc}$. The reference value is a known waveform, such as the sine function $\sin\theta$ or the cosine function $\cos\theta$. The voltage regulator 33 is connected to the subtracting device 32. The new reference value is equivalent to the control voltage reference value $v^*_{Cab}$ and $v^*_{Cbc}$ of ab phase and bc phase.

The reference value regulator 30 of FIG. 6 may comprise a first multiplier 10, a first filter 11, a first subtractor 12, a first proportional-integral controller 13 and an adder 14 of the amplitude reference value unit 5 of FIG. 3. In other words, the amplitude reference value unit 5 of FIG. 3 is a portion of the reference value regulator 30. The first multiplier 10 outputs a first voltage $A_{1\_ab}$. The actual value of ab line capacitance voltage $v_{Cab}$ and a sine function $\sin\theta$ are inputted to the first multiplier 10. The first filter 11 is connected to the first multiplier 10, and the first filter 11 captures the DC part of the first voltage $A_{1\_ab}$. And the first filter 11 outputs an error DC component $A_{2\_ab}$. The first subtractor 12 is connected to the first filter 11, and the first subtractor 12 outputs a second voltage $A_{3\_ab}$ (an amplitude error component). The first subtractor 12 subtracts the error DC component $A_{2\_ab}$ from a target voltage amplitude $V_L^{rms}$ (which is divided by $\sqrt{2}$ because of the coefficient relation of the operation). The first proportional-integral controller 13 is connected to the first subtractor 10, and the first proportional-integral controller 13 outputs an amplitude error compensation value $\Delta v_{Cab}$. The first proportional-integral controller 13 adjusts the second voltage $A_{3\_ab}$, and the second voltage $A_{3\_ab}$ can be considered as an amplitude error component. The adder 14 is connected to the first proportional-integral controller 13, and the adder 14 outputs an amplitude reference value Amplitude_ab. The adder 14 adds the amplitude error compensation value Amplitude_ab (Amplitude_ab=$\sqrt{2}V_L^{rms}+\Delta v_{Cab}$) to the target voltage amplitude $V_L^{rms}$ (which is multiplied by $\sqrt{2}$ in order to obtain the peak value of the target voltage amplitude $V_L^{rms}$).

The reference value regulator 30 of FIG. 6 further comprises a second multiplier 20, a second filter 21, a second proportional-integral controller 22 and a second subtractor 23 of the phase reference value unit 7 of FIG. 4. In other words, the phase reference value unit 7 of FIG. 4 is a portion of the reference value regulator 30 of FIG. 6. The second multiplier 20 of FIG. 4 outputs a third voltage $P_{1\_ab}$. The actual value of ab line capacitance voltage $v_{Cab}$ and a cosine function $\cos\theta$ are inputted to the second multiplier 20. The second filter 21 is connected to the second multiplier 20, and the second filter 21 captures the phase part of the third voltage $P_{1\_ab}$. And the second filter 21 outputs a phase error component $P_{2\_ab}$. The second proportional-integral controller 22 is connected to the second filter 21, and the second proportional-integral controller 22 outputs a phase error compensation value $\Delta\Phi_{ab}$. The second proportional-integral controller 22 adjusts the phase error component $P_{2\_ab}$. The second subtractor 23 is connected to the second proportional-integral controller 22, and the second subtractor 23 outputs a phase reference value phase_ab (Phase_ab=$\theta-\Delta\Phi_{ab}$). The second subtractor 23 subtracts the phase error compensation value $\Delta\Phi_{ab}$ from the target voltage phase $\theta$. In an embodiment, the reference value regulator 30 can also comprise FIG. 5A. The sine wave generator 24a is connected to the ab-phase phase reference value unit 7a, and the sine wave generator 24a outputs a sine wave value $\sin(\theta-\Delta\Phi_{ab})$. The phase reference value phase_ab is inputted to the sine wave generator 24a. The ab phase third multiplier 31a outputs the control voltage reference value $v^*_{Cab}$. The amplitude reference value Amplitude_ab and the sine wave value $\sin(\theta-\Delta\Phi_{ab})$ are inputted to the ab phase third multiplier 31a. The bc phase third multiplier 31b outputs the control voltage reference value $v^*_{Cbc}$, and the amplitude reference value Amplitude_bc and the sine wave value $$\sin\left(\theta - \frac{2\pi}{3} - \Delta\Phi_{bc}\right)$$

are inputted to the bc phase third multiplier 31b.

Figure 7A:
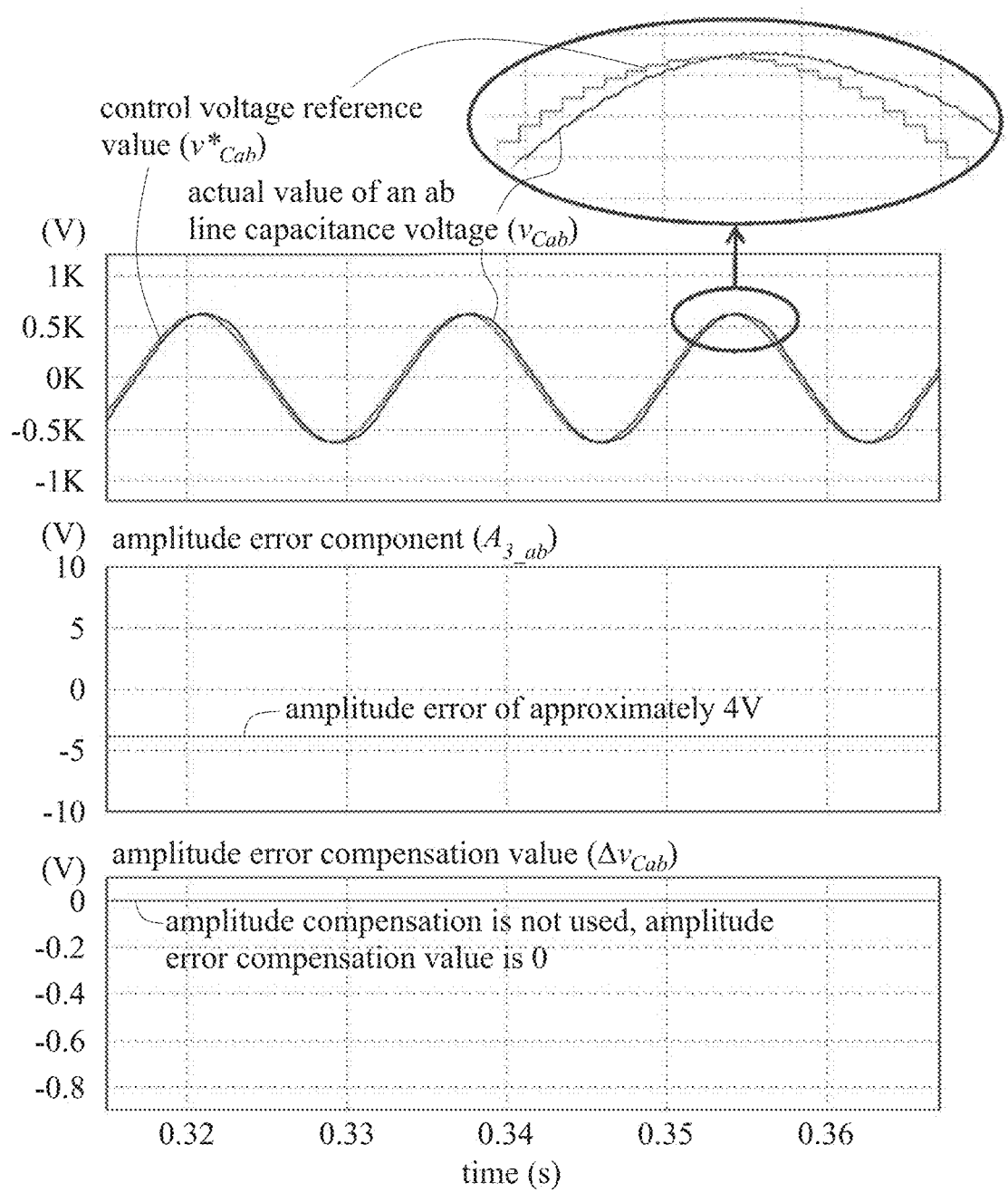
FIG. 7A shows a simulation result when amplitude control according to the present disclosure is not used.
Figure 7B:
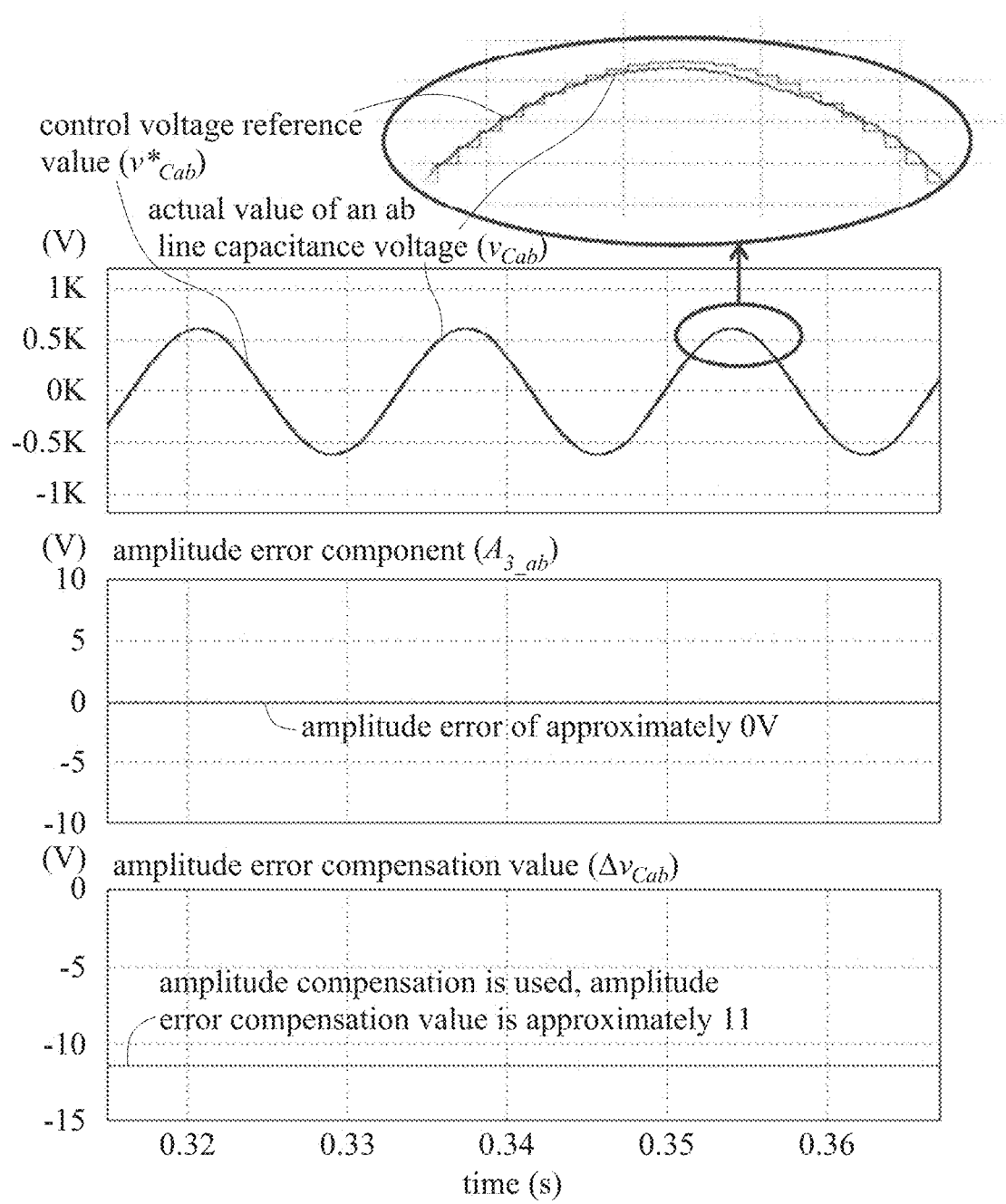
FIG. 7B shows a simulation result when amplitude control according to the present disclosure is used.

FIG. 7A is a simulation result when the amplitude control according to the present disclosure is not used. FIG. 7B is a simulation result when the amplitude control according to the present disclosure is used. It can be seen from FIG. 7A and FIG. 7B that the control voltage reference value $v^*_{Cab}$ is the sampled and held control voltage reference value, and is thus a sawtooth wave. According to the present disclosure, the original control command is compensated and slightly modulated, allowing the compensated control voltage reference value $v^*_{Cab}$ to track the actual value of ab line capacitance voltage $v_{Cab}$ more accurately. The bottom drawing of FIG. 7A represents a state that the voltage amplitude of the control voltage reference value $v^*_{Cab}$ is not compensated. The amplitude error compensation value ($\Delta v_{Cab}$) has an amplitude error compensation value of zero. The middle drawing shows that the amplitude error component $A_{3\_ab}$ has an amplitude error of approximately 4V. The upper drawing shows that the control voltage reference value $v^*_{Cab}$ is deviated from the actual value of ab line capacitance voltage $v_{Cab}$. The bottom drawing of FIG. 7B represents a state that the voltage amplitude of the control voltage reference value $v^*_{Cab}$ is compensated. The amplitude error compensation value ($\Delta v_{Cab}$) has an amplitude error compensation value of approximately 11V. The middle drawing shows that the amplitude error component $A_{3\_ab}$ has an amplitude error of 0V, diminishing the original amplitude error. The upper drawing shows that the control voltage reference value $v^*_{Cab}$ is approaching the actual value of ab line capacitance voltage $v_{Cab}$. Therefore, the simulation result that the amplitude control is not used according to the present disclosure has an amplitude error of approximately 4V, while the amplitude reference value unit 5 of FIG. 3 according to the present disclosure has an amplitude error of 0V. The first proportional-integral controller 13 according to the present disclosure will generate an amplitude error compensation value $\Delta v_{Cab}$ of approximately 11V, to cause the output voltage amplitude to be balanced.

Figure 8A:
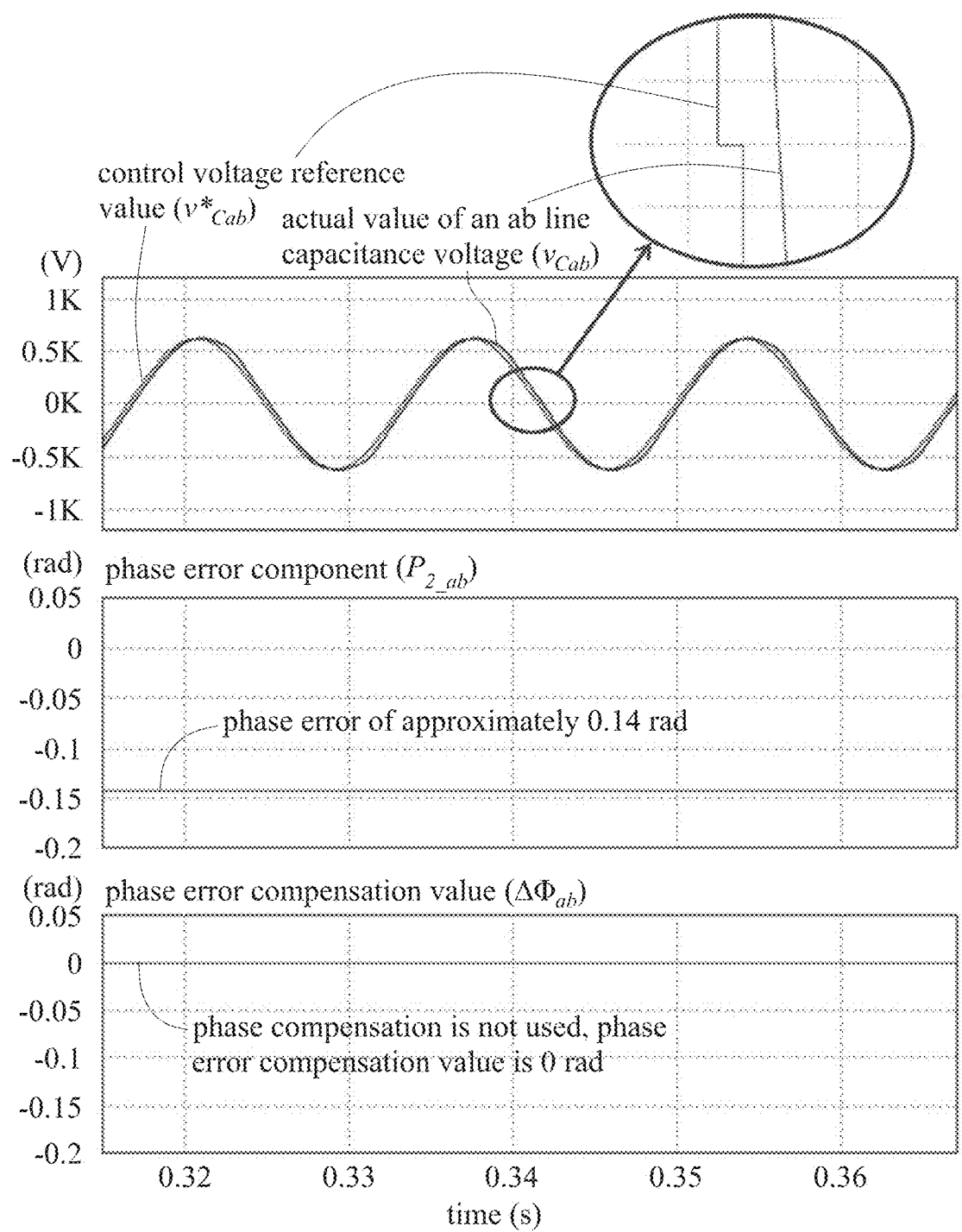
FIG. 8A shows a simulation result when phase control according to the present disclosure is not used.
Figure 8B:
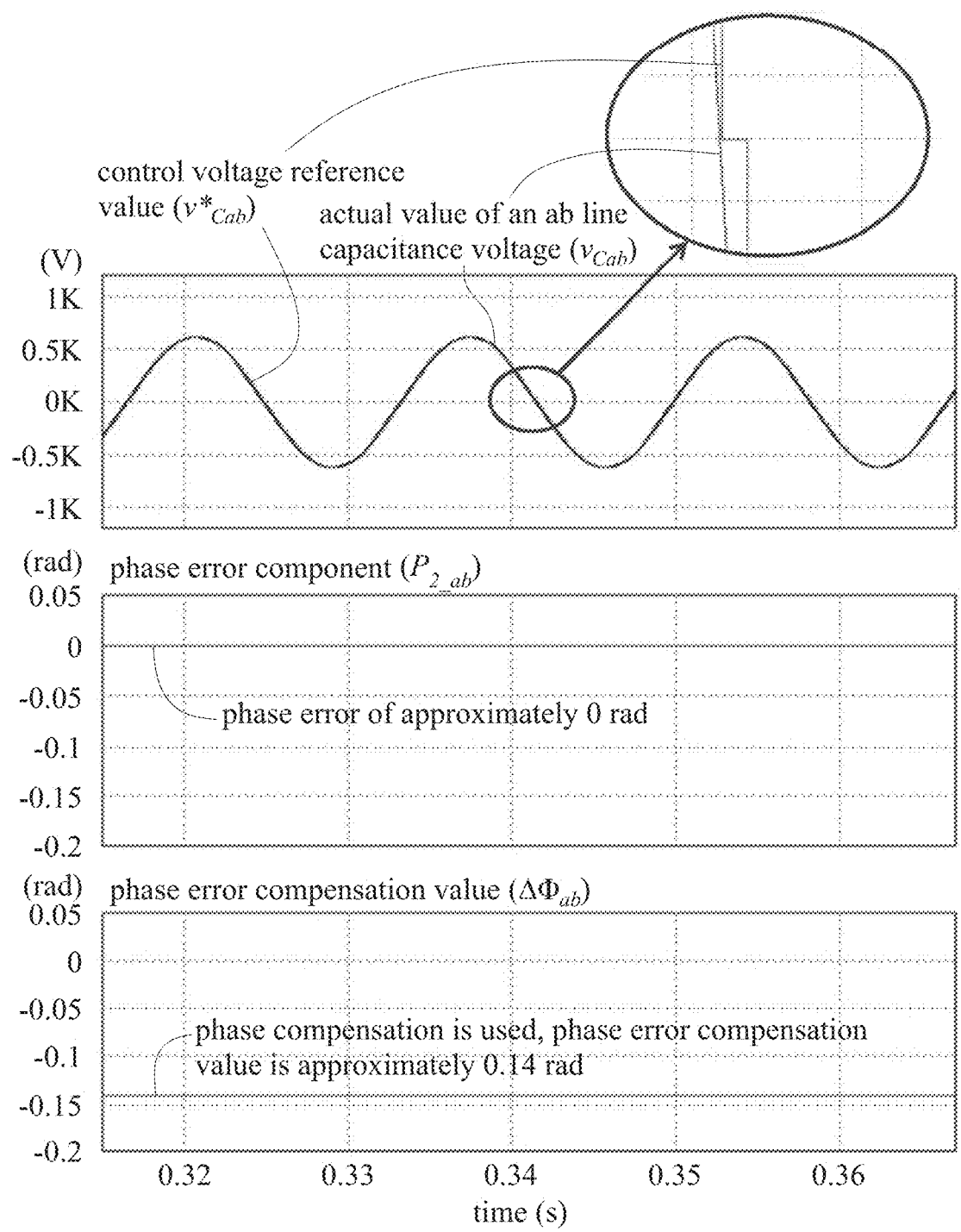
FIG. 8B shows a simulation result when phase control according to the present disclosure is used.

FIG. 8A is a simulation result when the phase control according to the present disclosure is not used. FIG. 8B is a simulation result when the phase control according to the present disclosure is used. According to the present disclosure, the phase of the original control voltage reference value is compensated to generate the compensated control voltage reference value $v^*_{Cab}$, such that the output result is close to the actual value of ab line capacitance voltage $v_{Cab}$. It can be seen from FIG. 8A and FIG. 8B that the bottom drawing of FIG. 8A represents a state that a phase of the control voltage reference value $v^*_{Cab}$ is not compensated. The phase error compensation value ($\Delta\Phi_{ab}$) has a phase error compensation value of 0 rad. The middle drawing shows that the phase error component $P_{2\_ab}$ has a phase error of approximately 0.14 rad. The upper drawing shows that the control voltage reference value $v^*_{Cab}$ is deviated from the actual value of ab line capacitance voltage $v_{Cab}$. The bottom drawing of FIG. 8B represents a state that a phase of the control voltage reference value $v^*_{Cab}$ is compensated. The phase error compensation value ($\Delta\Phi_{ab}$) has a phase error compensation value of approximately 0.14 rad. The middle drawing shows that the phase error component $P_{2\_ab}$ has a phase error of 0 rad, diminishing the original phase error. The upper drawing shows that the control voltage reference value $v^*_{Cab}$ is approaching the actual value of ab line capacitance voltage $v_{Cab}$. The simulation result has a phase error of approximately 0.14 rad when the phase control according to the present disclosure is not used, and has a phase error of 0 rad when the phase error of the phase reference value unit 7 of FIG. 4 according to the present disclosure is used. The second proportional-integral controller 22 according to the present disclosure will also generate a phase error compensation value of approximately 0.14 rad, which causes phases of the output voltage to be balanced. After being amplitude-compensated by the amplitude reference value unit 5 of FIG. 3 and phase-compensated by the phase reference value unit 7 of FIG. 4, the control voltage reference value $v^*_{Cab}$ is much more approaching the actual value of ab line capacitance voltage $v_{Cab}$.

Figure 9A:
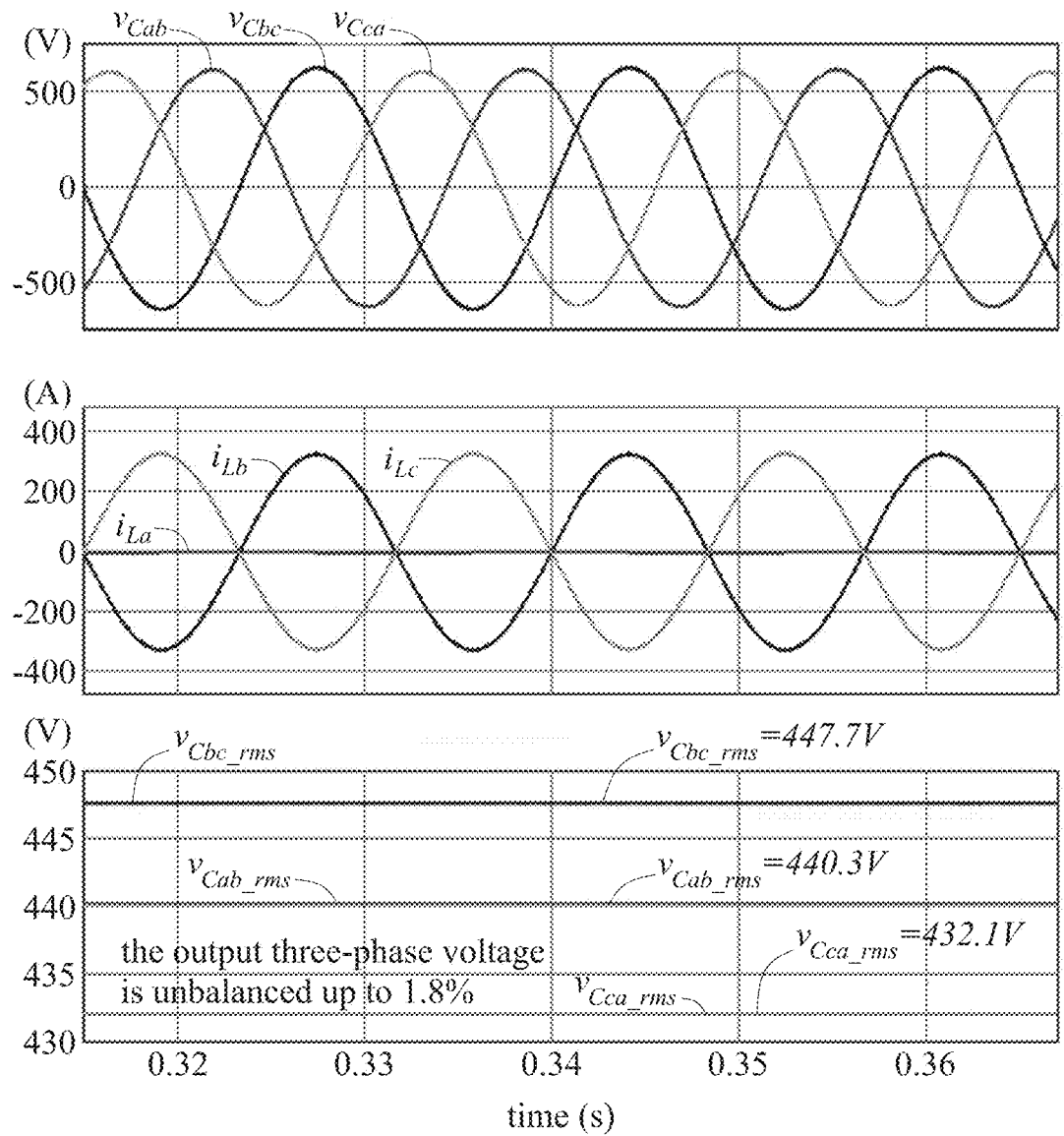
FIG. 9A shows a simulation result when amplitude control and phase control according to the present disclosure are not used.

FIG. 9A is a simulation result when the amplitude control and the phase control according to the present disclosure are not used. In a situation that the switching frequency is 6.48 kHz, the control voltage reference values $v^*_{Cab}$ and $v^*_{Cbc}$ can be expressed by equations (12) and (13), respectively:

$$v^*_{Cab} = E_m \sin\theta \tag{12}$$

$$v^*_{Cbc} = E_m \sin\left(\theta - \frac{2}{3}\pi\right) \tag{13}$$

Figure 9B:
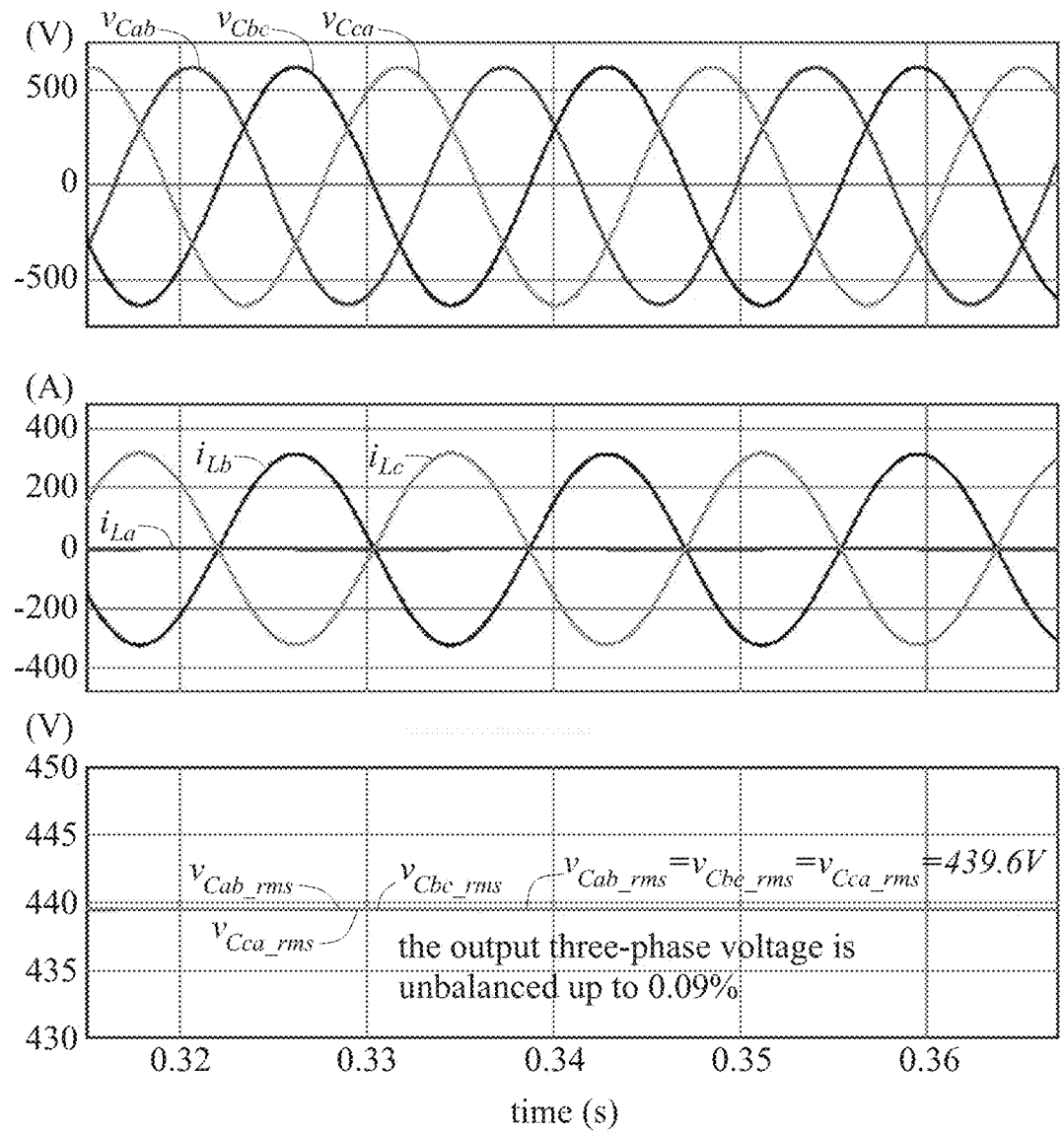
FIG. 9B shows a simulation result when amplitude control and phase control according to the present disclosure are used.

FIG. 9B is a simulation result when the amplitude control and the phase control according to the present disclosure are used. In a situation that the switching frequency is also 6.48 kHz, the control voltage reference values of ab phase and bc phase $V_{Cab}^{*'}$ and $v_{Cbc}^{*'}$ (which are compensated) can be expressed by equations (14) and (15), respectively:

$$v^{*'}_{Cab} = (E_m + \Delta v_{Cab})\sin(\theta - \Delta\Phi_{ab}) \tag{14}$$

$$v^{*'}_{Cbc} = (E_m + \Delta v_{Cbc})\sin\left(\theta - \frac{2}{3}\pi - \Delta\Phi_{bc}\right) \tag{15}$$

The simulation results shown in FIG. 9A and FIG. 9B comprise the comparing result of three-phase output voltages, currents and voltage effective values, wherein $v_{Cab}$ is the actual value of an ab line capacitance voltage, $V_{Cbc}$ is the actual value of a bc line capacitance voltage, $V_{Cca}$ is the actual value of a ca line capacitance voltage, $i_{La}$ is a load current of a phase, $i_{Lb}$ is a load current of b phase, $i_{Lc}$ is a load current of c phase, $v_{Cab\_rms}$ is an effective value of an ab line capacitance voltage, $v_{Cbc\_rms}$ is an effective value of a bc line capacitance voltage, and $v_{Cca\_rms}$ is an effective value of a ca line capacitance voltage. FIG. 9A simulates an unbalanced situation that the load is not connected to a phase, and the phase control and the amplitude control according to the present disclosure are not used. The output load current of a phase is 0A and the three-phase output voltage exceeds a target value of 440V, wherein $v_{Cab\_rms}$ is 440.3V, $v_{Cbc\_rms}$ is 447.7V, $v_{Cca\_rms}$ is 432.1V. The unbalanced percentage of the output three-phase voltage is 1.8%, and the effective value of capacitance voltage between lines (between $v_{Cbc\_rms}$ and $v_{Cab\_rms}$; between $v_{Cab\_rms}$ and $v_{Cca\_rms}$) has an unbalanced voltage of approximately 8V. FIG. 9B simulate an unbalanced situation that the load is not connected to a phase, and the phase control and the amplitude control according to the present disclosure is used. The three-phase output voltage is controlled to be around the target value of 440V, wherein $v_{Cab\_rms}$, $v_{Cbc\_rms}$ and $v_{Cca\_rms}$ are 439.6V, the unbalanced percentage of the output three-phase voltage is 0.09%, and the effective value of capacitance voltage between lines is balanced. Therefore, after the voltage balance control method and the voltage balance control device according to the present disclosure are used, the output voltage unbalanced due to the unbalanced load resulted from impendence mismatching is improved significantly.

In sum, in consideration of unbalanced output load (for instance, the manufacturing error of an inductor of an output AC filter will cause the output impendence mismatched, the voltage drop at the output end causes the output voltage unbalanced, and the conversion from a single-phase load to a three-phase load causes the output impendence mismatched), the present disclosure provides a voltage balance control method and a voltage balance control device applicable to a three-phase DC-AC inverter. The voltage balance control method and device compensate the amplitude and phase of the control voltage reference value $v*_{Cab}$, to ensure that the output result is close to the actual value of ab line capacitance voltage $v_{Cab}$. In other words, according to the present disclosure, a reference value regulator regulates an original control command (reference value) directly, and compares the regulated original control command with a feedback value, to obtain a new control command and regulate the controller. As the output impendence is not matched, the output three-phase voltage can be controlled and balanced. As the load is balanced, the parameter adjustment error of the controller can be improved. Accordingly, the precision of the controller is improved. A voltage balance control method and a voltage balance control device according to the present disclosure can be applied to a variety of controllers.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A voltage balance control method applicable to a three-phase DC-AC inverter, the voltage balance control method comprising:
   multiplying, by a first multiplier, an actual value of a line capacitance voltage by a sine function to generate a first voltage;
   capturing, by a first filter, a DC part of the first voltage to generate an error DC component;
   subtracting, by a first subtractor, the error DC component from a target voltage amplitude to generate a second voltage;
   adjusting, by a first proportional-integral controller, the second voltage to generate an amplitude error compensation value; and
   adding, by an adder, the amplitude error compensation value with the target voltage amplitude to generate an amplitude reference value.

2. The voltage balance control method of claim 1, wherein the first voltage comprises the error DC component and a two-time angular frequency component.

3. The voltage balance control method of claim 1, further comprising multiplying, by a second multiplier, the actual value of the line capacitance voltage by a cosine function to generate a third voltage.

4. The voltage balance control method of claim 3, further comprising capturing, by a second filter, a phase part of the third voltage to generate a phase error component.

5. The voltage balance control method of claim 4, further comprising adjusting, by a second proportional-integral controller, the phase error component to generate a phase error compensation value.

6. The voltage balance control method of claim 5, further comprising subtracting, by a second subtractor, the phase error compensation value from a target voltage phase to generate a phase reference value.

7. The voltage balance control method of claim 6, further comprising receiving, by a sine wave generator, the phase reference value to generate a sine wave value.

8. The voltage balance control method of claim 7, further comprising multiplying, by a third multiplier, the amplitude reference value with the sine wave value to generate a control voltage reference value.

9. A voltage balance control device applicable to a three-phase DC-AC inverter, the voltage balance control device being implemented by a chip or integrated in the chip, and comprising:
   a reference value regulator configured for outputting a new reference value, wherein a feedback value is inputted to the reference value regulator;
   a subtracting device connected to an output end of the reference value regulator and configured for subtracting the feedback value from the new reference value; and
   a voltage regulator connected to the subtracting device, wherein the reference value regulator comprises:
   a first multiplier;
   a first filter connected to the first multiplier;
   a first subtractor connected to the first filter;
   a first proportional-integral controller connected to the first subtractor; and
   an adder connected to the first proportional-integral controller.

10. The voltage balance control device of claim 9, wherein:
   the first multiplier is configured for outputting a first voltage, wherein the feedback value and a sine function are inputted to the first multiplier;
   the first filter is configured for capturing a DC part of the first voltage and outputting an error DC component;
   the first subtractor is configured for outputting a second voltage, wherein the first subtractor subtracts the error DC component from a target voltage amplitude;
   the first proportional-integral controller is configured for outputting an amplitude error compensation value, wherein the first proportional-integral controller adjusts the second voltage; and
   the adder is configured for outputting an amplitude reference value, wherein the adder adds the amplitude error compensation value to the target voltage amplitude.

11. The voltage balance control device of claim 10, wherein the reference value regulator comprises:
- a second multiplier configured for outputting a third voltage, wherein the feedback value and a cosine function are inputted to the second multiplier;
- a second filter connected to the second multiplier and configured for capturing a phase part of the third voltage and outputting a phase error component;
- a second proportional-integral controller connected to the second filter and configured for outputting a phase error compensation value, wherein the second proportional-integral controller adjusts the phase error component;
- a second subtractor connected to the second proportional-integral controller and configured for outputting a phase reference value, wherein the second subtractor subtracts the phase error compensation value from a target voltage phase; and
- a sine wave generator connected to the second subtractor and configured for outputting a sine wave value, wherein the phase reference value is inputted to the sine wave generator.

12. The voltage balance control device of claim 11, wherein the reference value regulator comprises a third multiplier configured for outputting the new reference value, wherein the amplitude reference value and the sine wave value are inputted to the third multiplier.

* * * * *